(12) United States Patent
Jamieson

(10) Patent No.: US 11,182,704 B2
(45) Date of Patent: Nov. 23, 2021

(54) BOOKING SYSTEM FOR PERSONNEL SUPPLY CHAINS

(71) Applicant: Resource Connect Holdings Pty Ltd, Queensland (AU)

(72) Inventor: Geoffrey Jamieson, Queensland (AU)

(73) Assignee: RESOURCE CONNECT HOLDINGS PTY LTD

( * ) Notice: Subject to any disclaimer, the term of this patent is extended or adjusted under 35 U.S.C. 154(b) by 103 days.

(21) Appl. No.: 16/085,647

(22) PCT Filed: Jan. 13, 2017

(86) PCT No.: PCT/AU2017/050025
§ 371 (c)(1),
(2) Date: Sep. 17, 2018

(87) PCT Pub. No.: WO2017/124138
PCT Pub. Date: Jul. 27, 2017

(65) Prior Publication Data
US 2019/0034848 A1    Jan. 31, 2019

(30) Foreign Application Priority Data

Jan. 19, 2016 (AU) .................................. 2016900153

(51) Int. Cl.
*G06Q 10/06* (2012.01)
*G06Q 10/02* (2012.01)

(52) U.S. Cl.
CPC ....... *G06Q 10/06311* (2013.01); *G06Q 10/02* (2013.01); *G06Q 10/06314* (2013.01);
(Continued)

(58) Field of Classification Search
CPC ............. G06Q 10/06311; G06Q 10/02; G06Q 10/063112; G06Q 10/06314; G06Q 10/06316
See application file for complete search history.

(56) References Cited

U.S. PATENT DOCUMENTS

2006/0247959 A1*  11/2006  Oden ............... G06Q 10/06315
                                                       705/7.14
2008/0140490 A1*   6/2008  Wang ................. G06Q 10/0631
                                                       705/7.12

FOREIGN PATENT DOCUMENTS

AU          2014100944 A4 *   9/2014

OTHER PUBLICATIONS

Minhas et al., Service Orientation for a Dynamic Enterprise, 2006 (Proceedings of the International Conference on Logistics and Supply Chain Management (ILSCM 2006), Hong Kong, 2006), 2006 and Sep. 8, 2013, http://citeseerx.ist.psu.edu/viewdoc/download?doi=10.1.1.71.1932&rep=rep1&type=pdf, p. 1-7.*

(Continued)

*Primary Examiner* — Jerry O'Connor
*Assistant Examiner* — James Webb
(74) *Attorney, Agent, or Firm* — Skinner and Associates; Joel D. Skinner, Jr.

(57) ABSTRACT

A web based booking platform for the booking of personnel, services and assets on a single database through a single supply chain comprising: a web server hosting a portal website, the portal providing access to other service and asset provider websites or email addresses of personnel members; wherein the creation of live manifests for each step including tracking planned movements of personnel either on an individual, multiple, group or collective basis facilitates the coordination of a total personnel supply chain that is continuous and connected at each point and which ensures that each time a change is made to a roster or manifest, the service or asset provider's database is updated accordingly and in turn, all user and/or client databases.

14 Claims, 2 Drawing Sheets

(52) U.S. Cl.
CPC ............... *G06Q 10/06316* (2013.01); *G06Q 10/063112* (2013.01)

(56) References Cited

OTHER PUBLICATIONS

Sagenda, Sagenda, www.sagenda.com/, pg, Jan. 6, 2016, www.sagenda.com/, p. 1-15.*
Sagesoftware, ERP as Document Management System, Dec. 24, 2015, https://www.sagesoftware.co.in/blogs/erp-as-document-management-system/, pg.*
"Service Orientation for a Dynamic Enterpese", Proceedings of the International Conference on Logistics and Supply Chain Management (LSCM) 2006). Hong Kong (Minhas, A et al.).
"Service-oriented architecture" (Wikipedia, 2015).

\* cited by examiner

BOOKING SYSTEM FOR PERSONNEL SUPPLY CHAINS

FIELD OF THE INVENTION

The current working environment in remote locations in Australia and around the world especially in the resources sector often involves a "fly in, fly out" (FIFO) situation wherein workers are transported from their home bases to remote worksites (e.g. mining) located across the country. Without computerization, this can only be described as a logistical nightmare. The problem is even more complicated with various proprietary computer systems available, these are all invariably different and customized programs each attempting to solve a particular problem in their own way. Irrespective of the rapid development in computer software (and hardware) and any anecdotal or technically informed commentary, there is to date no universal solution to the immense logistical problem of managing a vast workforce from the aspects and perspectives of different stakeholders, such as that of the individual worker, the employer and the various service and asset providers.

In seeking to address this difficult problem, this invention coordinates the booking of personnel, services and assets on a single database across a total personnel supply chain (TPSC) including recruitment, medicals, induction and training, regular public transport (RPT), flights, air charter, bus charter, light vehicle and plant, accommodation and worksites known as the personnel supply chain (PSC). Briefly and succinctly, the invention provides a Services Orientated Architecture (SOA) of one database that connects all personnel, service and asset provider databases via application programming interfaces (API's) for booking functions across the TPSC.

Connecting all of the processes onto one database ensures the personnel supply chain is not broken at any point therefore having a continuous and connected supply chain that ensures services, assets and personnel booked are matched and provides an active manifest environment operated in real time that automates, links and optimises the total process on a scale unknown to the prior art.

This invention connects all stakeholders within the TPSC in an electronic commerce environment via a booking platform and a smart application (App) that links all personnel of employers, service providers, and asset providers with a personnel identifier (QR code or biometric) in a single database environment for booking personnel, services and assets within the PSC that is linked to an events management and verification module to confirm their whereabouts at any time within the TPSC.

BACKGROUND OF THE INVENTION

The traditional prior art process of booking personnel, services and assets within the process of functions of onboarding, including recruitment, medicals, induction and training; the process of mobilization, including regular passenger transport, flights, air charter, bus charter, light vehicle and the worksite, including plant and equipment, accommodation and work packages, are not treated as a supply chain nor linked together to form a supply chain and are not done in a single total electronic commerce environment or single database environment or in a SOA environment.

It is largely a completely disjointed process with many different individual personnel, service and asset providers who all deliver in accordance with services they individually provide. There are many different intranet systems that do not link together, and many different software programs with databases that do not allow communication between them, resulting in a very ineffective system that does not benefit industry as a whole. The traditional process is expensive to manage, does not integrate the individual processes into a total system. In the prior art system, only some parts operate in an electronic environment. It is also mainly spreadsheet operated and creates many conflicts of interest. It also creates an environment where mistakes can easily be made, is very labor intensive. It is inherently inefficient, to the detriment of the personnel, service and asset providers. It underutilizes assets, creates safety issues and is particularly cost prohibitive to employers and project owners, which in turn causes undue pressure on all relevant stakeholders.

The existing prior art process is fragmented with some systems providing some parts of the solution on a database that connects some parts of the service and others providing other parts on other databases therefore there is no continuous or connected personnel supply chain. None provide a total solution on one database or provide one continuous and connected process across the TPSC. It is strongly held, the traditional prior art process is detrimental to industry as a whole especially as the booking of personnel, services and assets within the PSC is a critical element of any industry in today's environment. It is an expensive and high risk area for all concerned if not managed correctly. It is therefore an aim of the present invention to seek to ameliorate some of the disadvantages and limitations of traditional prior art systems of booking people, services and assets within the TPSC or to at least provide the public with an alternative and useful choice.

STATEMENT OF THE INVENTION

According to one but not necessarily the only aspect, the invention resides in a web based booking platform for the booking of personnel, services and assets on a single database through a single supply chain comprising:

a web server hosting a portal website, the portal providing access to other service and asset provider websites or email addresses of personnel members; the portal contactable through a universal resource locator by the personnel members, and the service and asset providers, via a member user system; the web server central processor interfacing with a directory component adapted to enable location of a particular personnel member's or service and asset provider's information or web address and/or website, geographical location or type of service or asset provided or booked;

a database adapted to store personnel member, service and asset provider data and information;

a database management component adapted to allow input and retrieval of the data and information;

a web browser adapted to interrogate and provide access to the information and data;

a member identification component adapted to qualify a personnel member's or service or asset provider's access to the information and data, including a unique identifier comprising a code or biometric;

a planning module for estimating the services and assets required for the number of personnel rostered for a project;

wherein each service and asset provider books and confirms the service or asset with software adapted to upload data and information to the booking platform;

whereby continually updating the booking platform, of multiple service and asset provider details and the booking of necessary services and assets and matching personnel with each service and asset requirement, enables the creation of live manifests for each step including tracking planned movements of personnel either on an individual, multiple, group or collective basis which facilitates the co-ordination of a total personnel supply chain that is continuous and connected at each point and which ensures that each time a change is made to a roster or manifest, the service or asset provider's database is updated accordingly and in turn, all user and/or client databases.

Preferably, each service and asset provider automatically uploads the service or asset booking via application programming interfaces to the database in a services orientated architecture (SOA) environment therefore confirming the service or asset is available so that active manifests can be created for each service or asset within a continuous and connected personnel supply chain.

Preferably, a qualified personnel member is connected via an App on a computer or smart phone wherein information for the total personnel supply chain life cycle of that personnel member through their individual recruitment cycle or their Rest & Recreation (R&R) cycle is available and managed through the App which also connects with an event and verification module identifying events and verification points using the unique identifier as required.

Preferably, the booking platform is connected via an App to a computer, tablet or smartphone which connects service and asset providers to personnel members including a live manifest whereby each provider can identify each personnel member on the manifest to ensure they are matched with the service or asset being provided.

Preferably, the booking platform connected via an App to an event and verification management module to manage all events which occur for that personnel member during their Recruitment cycle or their R&R cycle.

Preferably, the member's booking information and itinerary is downloaded to the App on their smartphone or computer for starting work at the start of a cycle which would include trip information from home to airport, location of accommodation, medicals, induction & training, regular public transport, flights which is linked to the event and verification module so they can be tracked through the process and are ready to be mobilized to the place of work.

Preferably the data and information collected for each member would include:

Their booking information and itinerary for their worksite accommodation and the worksite they will be required at.

Their booking information and itinerary for travel by bus from their induction & training accommodation point to the nearest airport linked to the event and verification module so they can be tracked through that process.

Their booking information and itinerary for their air flight from induction airport to nearest worksite airport linked to the event and verification module so they can be tracked through that process.

Their booking information and itinerary for travel from airport by bus to worksite accommodation linked to the event and verification module so they can be tracked through that process.

Their booking information and itinerary for travel by light vehicle from their worksite accommodation to worksite and return each day linked to the event and verification module so they can be tracked through that process.

Their booking information and itinerary for travel by bus from their accommodation to worksite and return each day linked to the event and verification module so they can be tracked through that process.

Their booking information and itinerary for travel by bus from their worksite accommodation to the nearest worksite airport at the end of the work cycle for R&R and linking to the event and verification module so they can be tracked through that process.

Their booking information and travel itinerary by plane or bus from the nearest worksite airport to the closest airport for their R&R linked to the event and verification module so they can be tracked through that process.

Preferably, built into the software will be a dashboard showing all bookings of all personnel members and where they are situated within the personnel supply chain at any given point of time that can be accessed by employers, project managers or service and asset providers.

Preferably, built into the app will be a personnel member communication module adapted to link all databases within the PSC via an API intended to provide a better service and experience to the personnel member, service and asset providers to the benefit of the industry as a whole, There can be a communications booking management module adapted to link all personnel members and external stakeholders to a remote user module.

There can be an invoicing system that allows for the issue and tracking of invoices associated with all facets of the industry so that all stakeholders within the industry are invoicing and receiving payments on one database management system.

Preferably the personnel member system is a computer system with an interactive display means for communication via the Internet to tablets and smartphones.

Preferably the interactive display means includes a visual display unit with an interactive device, typically a key pad, touch pad, mouse and/or joystick device.

Preferably information and data on the website is presented and accessed by all personnel members, service and asset providers online via a web page or an app on a computer, tablet or smartphone.

Preferably the directory component enables personnel members, service and asset providers to have a unique identifier number that recognizes their title, name, physical address, locality, post code, discipline or by the type of services or assets they are supplying or booked into or onto.

Preferably the personnel member, service and asset provider identification component includes security protocols that qualify and restrict access of the personnel member according to the personnel member's security clearance or access levels.

The personnel member, service or asset provider identification component preferably comprises a firewall, an access manager and a software router to qualify the access of the member to appropriate application layers of the web server according to the security clearance or access level of the personnel member, service or asset provider.

Preferably personnel member, service or asset provider access is via a user name and/or password recognized or rejected by the access manager or by fingerprint recognition or other biometric technology on a handheld device, or an external device at a verification point if they have lost their handheld device.

Preferably the transaction management component includes an accounting function which can be interfaced with an externally sourced transaction and record keeping service which also has the ability to repair and generate relevant accounting and transaction management documents and records.

Preferably the accounting functions are able to be varied and adjusted via the Internet.

Preferably the information and data held in the database can be interrogated and can be manipulated to produce various reports that can be downloaded or accessed via a web page or an app by all stakeholders. The database is preferably a relational database which is managed by a relational database management system.

Preferably the web server also interfaces with a global positioning system (GPS) or geographic information system (GIS) component adapted to provide a virtual display of where any personnel or service provider is located or any asset is located at any given point of time Preferably there is a contacts management module as part of an internal management system whereby a site manager can add new personnel by searching the personnel membership database to identify a personnel member by name.

Preferably there is a personnel member diary management module adapted to function as a diary system that is linked to all bookings as a diary reminder system utilizing text reminders or email reminders to automatically remind relevant parties of their bookings during their work cycle.

Preferably there is a time management module adapted to manage all tasks carried out by all personnel members associated with a job; allow for billing rates to be set for each personnel member of an internal management team and wherein all time spent on a job are tracked inclusive of telephone calls, emails, documents created, events and any other time spent by the internal and/or external management team.

Preferably there is a communications management module adapted to function as a communication centre to manage all bookings, manifests, text messages, emails, telephone calls, facsimiles and memos that are created in the course of managing personnel members, service and asset providers on a particular job.

Preferably the platform automatically creates a live manifest and electronically sends that live manifest to each service or asset provider showing them which personnel members are booked into a particular service or on a particular asset provided by each provider so they can operate efficiently in a live environment without need to enter new data each time, and which allows a provider to see changes as they occur.

Preferably the PSC management module can be linked to or integrated with the events and verification management module and connect to all service and asset providers via API's.

The booking platform connects via application programming interfaces to a client's in house platforms and databases so the client can create rosters for each personnel working on a project which then automatically books them into services or assets at each point within the personnel supply chain in accordance with the roster and project timetables; linking through application programming interfaces, each service and asset provider software system and database either directly or via an external or internal SOA thereby ensuring each time a change is made to a roster or manifest, the service or asset provider's database is updated accordingly.

The single supply chain further facilitates the functions of onboarding, including recruitment, medicals, induction and training; the process of mobilization, including regular passenger transport, flights, air charter, bus charter, light vehicle and the worksite, including plant and equipment, accommodation and work packages.

BRIEF DESCRIPTION OF THE DRAWINGS

In order that the invention be more readily understood and put into practical effect, reference will now be made to the accompanying illustration wherein.

DETAILED DESCRIPTION

Figure 1:
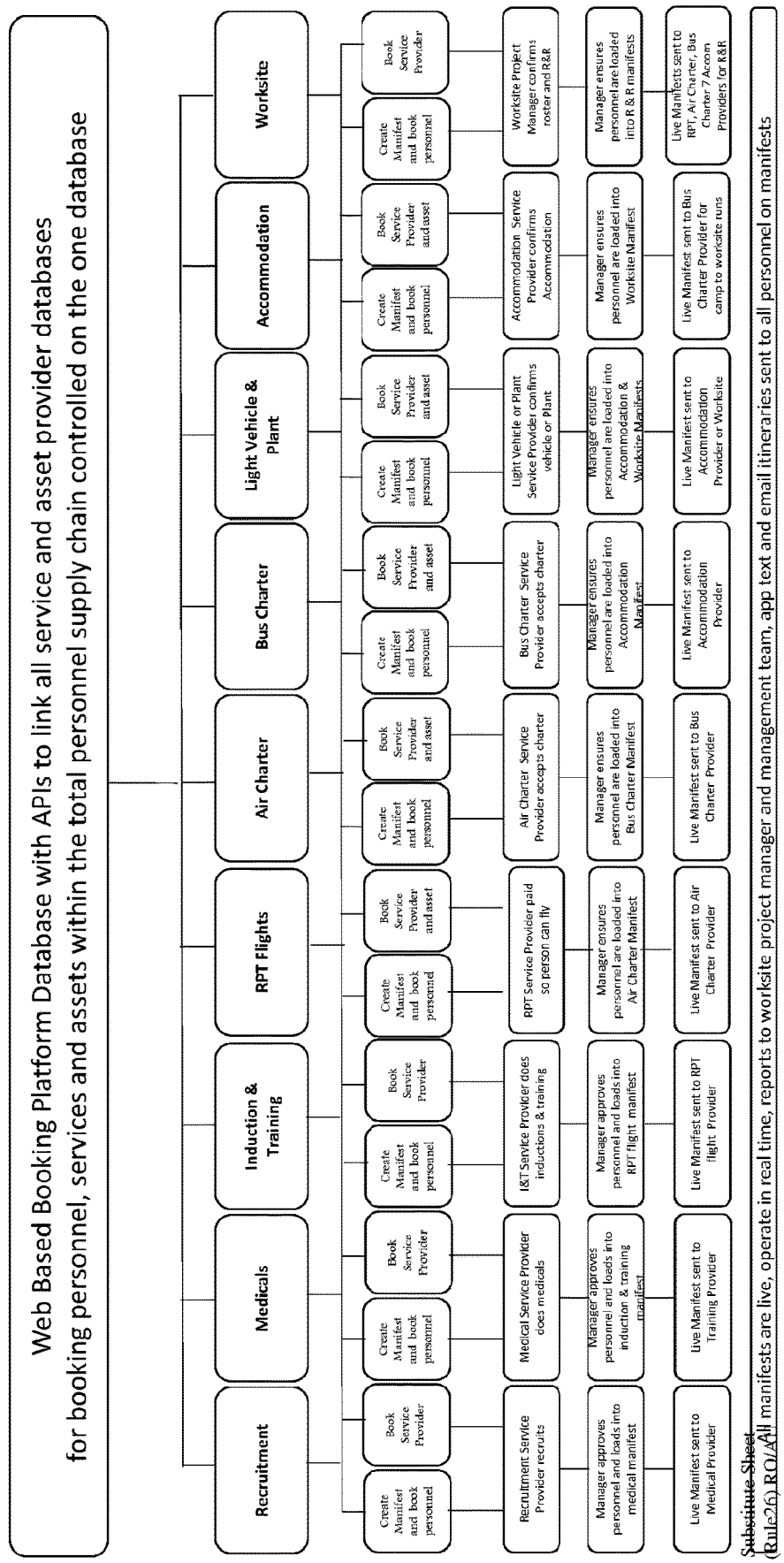
FIG. 1 shows a flow diagram of a preferred architecture of the Web Based Booking Platform according to the invention.

FIG. 1 shows a preferred architecture of booking personnel members, services or assets for each step through the PSC via a web based software platform that is extricably linked to an App for computers, tablets or smartphones that connects to the same database. Which in turn, manages the bookings for each personnel member, service and asset through each recruitment or R&R cycle within the one database. It is connected to all service and asset providers' databases via API's. This also links via the manifests to the each event. The booking platform comprises a database on a web based live platform to book personnel, services and assets for each step in the PSC (certifications, testing and references stored in profile).

The database comprises personnel member profiles attached to a unique identifier for that personnel member to verify personnel movements throughout the TPSC.

The database comprises service and asset provider's details and a list of their services or assets so they can be allocated for utilization at each step in PSC.

The database preferably includes a module to allow workers to manage their own profile.

The platform creates manifests at each step within the PSC to book personnel members to that manifest for the service or asset to which the personnel member is allocated within the PSC.

An administrator is able to book services and assets with each service provider and provide manifests of all personnel booked to a service or asset within the PSC.

A manager or administrator approves each step for personnel members within the PSC before that personnel member is able to progress to the next step within the PSC.

Each manifest including planned movements of the personnel either on an individual, multiple, group or collective basis created within the PSC is live and when updated provides real time data to each personnel member by updating their itinerary via the App, text or email. It also updates each service or asset provider's database via an API so they can manage the delivery of the service or asset they are providing.

The platform also provides live reports to the management team so they have a clear line of sight through the PSC and can ensure that each service and asset within the PSC is being utilized as optimally as is possible.

Figure 2:
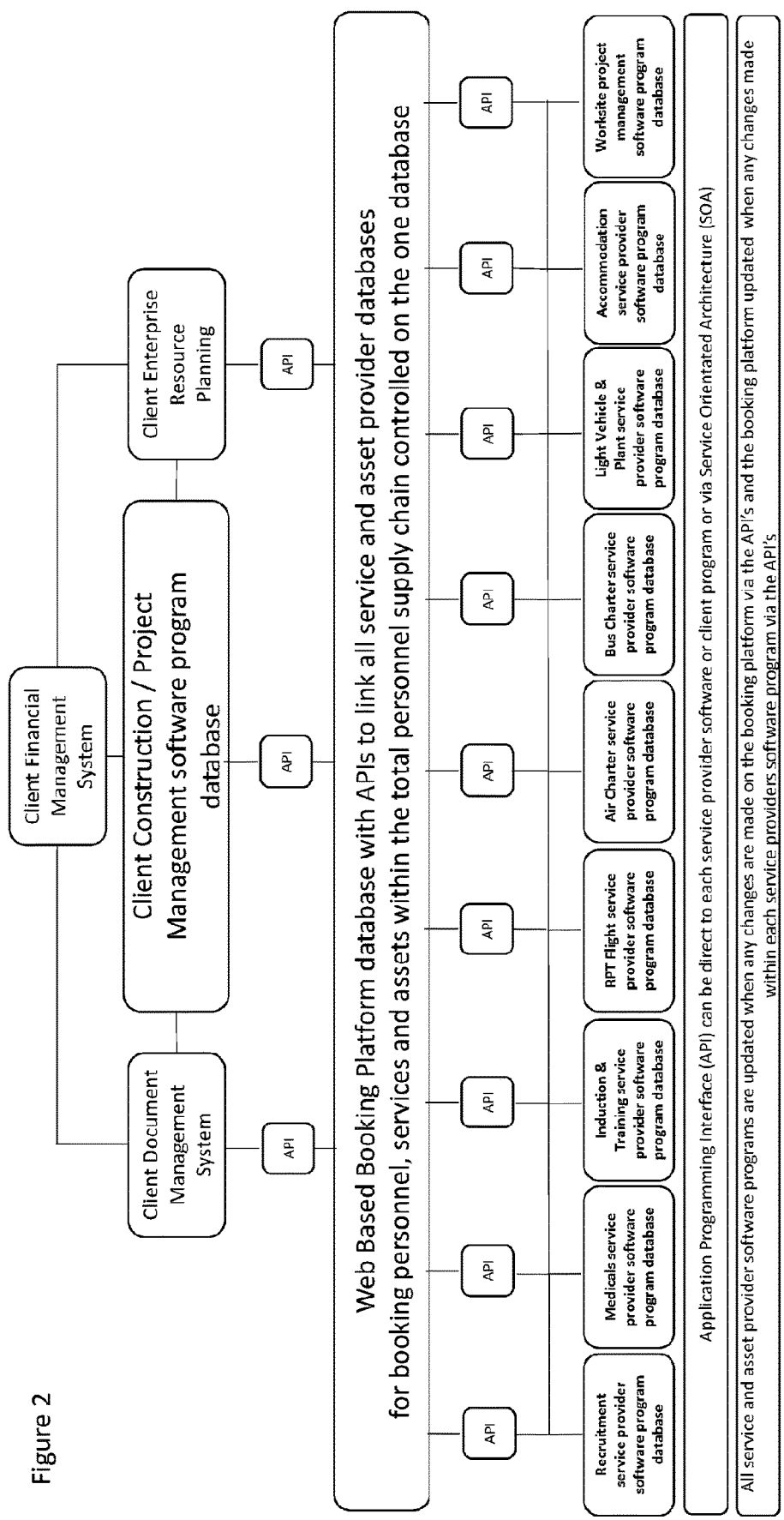
FIG. 2 shows a flow diagram of the architecture of the Web Based Booking Platform with a common database that links all personnel, services and assets required within a project to the PSC via API's in an SOA environment.

FIG. 2 shows a preferred architecture relating to a web based booking platform connecting via API's to a client's construction management or project management system which in turn links to the client's enterprise resource planning (ERP), document management and financial management system. This is so personnel information can automatically flow between the web based booking platform and the client's in house platforms. The web based platform according to the invention comprises the interface with each service and asset provider to ensure personnel are matched to services and assets within the PSC and the flow of data via API's.

Specifically, it comprises a live web based platform with one database that connects via API's to each of the client's in house platforms and databases so the client can create rosters for each personnel working on the project which then automatically books them into services or assets at each point within the PSC in accordance with the roster and project timetables. It also comprises a web based platform with one database that links through API's, each service and asset provider software system and database either directly or via an external or internal SOA. This is to ensure that each time a change is made to a roster or manifest, the service or asset provider's database is updated accordingly and in turn the clients databases.

Advantages

The advantages of the present invention over traditional prior art management mechanisms are set out in this section and include:

The ability to operate in an e-commerce environment on one database for the TPSC resulting in bringing down the enormous costs currently associated with the prior art.

The creation of a supply chain that delivers one booking platform across the TPSC and the ability to create live manifests to allow changes to be made to manifests in real time whilst providing instant updates to personnel, service and asset providers.

The use of a common database linking all industry participants via API's in the TPSC will result in greater efficiency and introduce significant flexibility to the management process of personnel, services and assets utilized within the TPSC.

The management of all industry transactions and processes within the one platform will provide ease of reporting, management of transactions and events, creating industry standards, provide a research tool for the industry, provide members with useful information thereby eliminating the disjointed prior art approach.

It provides personnel members, service and asset providers with advantages previously unavailable with prior art systems It delivers substantial project costs savings because of better utilization of assets and substantially less management required to manage TPSC.

It provides all the tools for a total re-engineering of current process to the benefit of the industry as a whole.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification, the word "comprise" and variations of that word such as "comprises" and "comprising", are not intended to exclude other additives, components, integers or steps.

The word "biometric" refers to any authentication technique that allows measurable physical characteristics to be automatically checked.

The word "code" refers to any word, letter, figure, numeral or symbol used as a digital identifier.

The word "manifest" refers to a list of personnel, including planned movements of the personnel either on an individual, multiple, group or collective basis.

The word "industry" refers to the resource sector, infrastructure sector, health sector, care sector, government sector or any other sector of industry that employs large workforces.

The invention claimed is:

1. A web based booking platform for deployment of a mobile workforce, said deployment having a plurality of deployment steps that form a personnel supply chain that allows for the live booking of personnel, services and assets on a database through a continuous supply chain wherein the continuous supply chain includes the functions of onboarding, including recruitment, medicals, induction and/or training, the process of mobilization, including regular passenger transport, flights, air charter, bus charter, light vehicle and/or the worksite including plant and equipment, accommodation and work packages, the web based booking platform comprising:
  a web server hosting a portal website, the portal providing access to other service and asset provider websites or email addresses of personnel members; the portal contactable through a universal resource locator by the personnel members, and the service and asset providers, via a member user system; the web server interfacing with:
  a directory component adapted to enable location of one or more of
    a particular personnel member's information stored in the database, web address, or website;
    a service and asset provider's information stored in the database, web address or website,
    a particular personnel member's geographical location; and
    a type of service or asset provided or booked;
  a database adapted to store personnel member, service and asset provider data and information;
  a database management component adapted to allow input and retrieval of the data and information;
  a web browser adapted to interrogate and provide access to the information and data;
  a member identification component adapted to qualify a personnel member's or service or asset provider's access to the information and data, including a unique identifier comprising a code or biometric;
  a client application programming interface connecting the web server to a client's management system, wherein information can automatically flow between the web based booking platform and the client's management system;
  provider application programming interfaces:
    configured so that each service and asset provider automatically uploads booking data via the application programming interfaces to the database in a services orientated architecture (SOA) environment thereby creating live manifests of all personnel, service and asset bookings, and
    configured to send the live manifests to a subsequent provider,
  wherein a client can create rosters for personnel members working on a project which then automatically book them into services or assets at each point within the personnel supply chain in accordance with the rosters;
  whereby continuously updating the booking platform for multiple personnel updates the live manifests for each deployment step in the supply chain on an individual, multiple, group or collective basis which facilitates the co-ordination of the personnel supply chain to be continuous and connected at each point; and the web based booking platform further comprising a planning module for estimating the services and assets required for the number of personnel rostered for a project, the planning module utilizing the updated live manifests.

2. The booking platform according to claim 1 further comprising an event and verification module for identifying events and verification points associated with deployment steps, such that personnel members can be tracked through the deployment steps of the personnel supply chain.

3. The booking platform according to claim 2 wherein all personnel members working on the project are tracked so that where they are situated within the personnel supply chain at any given point of time is readily accessible to update the live manifests for handover between deployment steps.

4. The booking platform according to claim 3 further comprising a personnel member communication module adapted to link databases within the personnel supply chain via one or more application programming interfaces.

5. The booking platform according to claim 2 further comprising a personnel supply chain management module in communication with the event and verification module, the personnel supply chain management module connecting all service and asset providers via the application programming interfaces in the SOA environment.

6. The booking platform according to claim 1 further comprising an invoicing system coordinate issuance and tracking of invoices associated with service and asset providers for the deployment steps on a common database management system.

7. The booking platform according to claim 1 wherein the database adapted to store personnel member, service and asset provider data and information is a computer system with an interactive display means for communication via the Internet wherein information and data is presented and accessed online via a page or an app on a computer, tablet or smartphone, which includes a directory which enables users to have a unique identifier code or biometric which recognizes title, name, physical address, locality, post code, discipline or type of services or assets supplied or booked, and security protocols to qualify and restrict access of a user according to the user's security clearance or access level; the security protocols comprising a firewall, at access manager and a software router to qualify the access of the user to appropriate seen e application web serve layers according to the security clearance or access level.

8. The booking platform according to claim 1 wherein there is a transaction management component which includes an accounting function which is interfaced with an externally sourced transaction and record keeping service having the ability to repair and generate relevant accounting and transaction management documents and records, and wherein accounting functions are able to be varied and adjusted over the Internet.

9. The booking platform according to claim 1 wherein information and data held in the database can be interrogated and manipulated to produce various reports that can be downloaded or accessed via a web page or an app.

10. The booking platform according to claim 1 wherein the platform interfaces with a global positioning system (GPS) or geographic information system (GIS) component adapted to provide a virtual display of where any personnel, service provider or any asset is located at any given point of time.

11. The booking platform according to claim 1 wherein there is a contacts management module as part of an internal management system whereby a site manager can add new personnel by searching the personnel membership database to identify a personnel member by name.

12. The booking platform according to claim 1 further comprising a personnel member diary management module adapted to function as a diary system for all personnel members of the project that is linked to all bookings as a diary reminder system utilizing text reminders or email reminders to automatically remind relevant parties of their bookings during a work cycle.

13. The booking platform according to claim 1 further comprising a time management module adapted to:
manage tasks carried out by all personnel members associated with the project;
allow for billing rates to be set for each personnel member of the project; and
track all time spent on the project.

14. The booking platform according to claim 1 further comprising a communications management module adapted to function as a communication centre to receive data input and manage bookings, manifests, text messages, emails, telephone calls, facsimiles and memos that are created in the course of managing personnel members, and service and asset providers for the personnel supply chain.

* * * * *